(12) United States Patent
Cubon et al.

(10) Patent No.: US 11,524,621 B2
(45) Date of Patent: Dec. 13, 2022

(54) LIGHT ASSEMBLY HEATER SYSTEMS, APPARATUS, AND METHODS

(71) Applicant: TRAMEC TERMICO TECHNOLOGIES LLC, Elk Grove Village, IL (US)

(72) Inventors: Michael M. Cubon, Park Ridge, IL (US); Gary E. Sullo, Lewiston, NY (US)

(73) Assignee: TRAMEC TERMICO TECHNOLOGIES LLC, Elk Grove, IL (US)

( * ) Notice: Subject to any disclaimer, the term of this patent is extended or adjusted under 35 U.S.C. 154(b) by 0 days.

(21) Appl. No.: 17/492,625

(22) Filed: Oct. 3, 2021

(65) Prior Publication Data

US 2022/0024369 A1 Jan. 27, 2022

Related U.S. Application Data

(62) Division of application No. 16/816,830, filed on Mar. 12, 2020, now Pat. No. 11,142,115.

(60) Provisional application No. 62/817,485, filed on Mar. 12, 2019.

(51) Int. Cl.
| | |
|---|---|
| *F21S 45/60* | (2018.01) |
| *B60Q 1/00* | (2006.01) |
| *H05B 3/00* | (2006.01) |
| *F21V 29/90* | (2015.01) |
| *F21Y 115/10* | (2016.01) |

(52) U.S. Cl.
CPC .......... *B60Q 1/0017* (2013.01); *F21S 45/60* (2018.01); *F21V 29/90* (2015.01); *H05B 3/0042* (2013.01); *F21Y 2115/10* (2016.08); *H05B 2203/002* (2013.01)

(58) Field of Classification Search
CPC ........ B60Q 1/0017; F21V 29/90; F21S 45/60; H05B 3/0042; H05B 2203/002; F21Y 2115/10
See application file for complete search history.

(56) References Cited

U.S. PATENT DOCUMENTS

| | | | |
|---|---|---|---|
| 7,262,388 B2 | 8/2007 | Moreth et al. | |
| 2013/0114279 A1* | 5/2013 | Marley | F21S 41/153 |
| | | | 362/516 |

* cited by examiner

*Primary Examiner* — Henry Luong
(74) *Attorney, Agent, or Firm* — Tarolli, Sundheim, Covell & Tummino LLP

(57) ABSTRACT

A heater system for an LED light assembly having a lens includes a flexible composite positioned around an outer surface of the lens. The flexible composite includes a polymer base layer, a plurality of conductive buses provided on the base layer, and a resistive layer electrically connecting the plurality of buses to form a circuit. The resistive layer includes conductor particles dispersed in a polymer matrix. The resistive layer has a crystalline first condition prior to applying electricity to one of the buses and an amorphous second condition in response to applying electricity to one of the buses.

12 Claims, 9 Drawing Sheets

LIGHT ASSEMBLY HEATER SYSTEMS, APPARATUS, AND METHODS

RELATED APPLICATIONS

This application is a divisional application of U.S. patent application Ser. No. 16/816,830 which claims priority from U.S. Provisional Application Ser. No. 62/817,485, filed Mar. 12, 2019, which is incorporated by reference herein in its entirety.

TECHNICAL FIELD

The present invention relates generally to heater systems, and specifically to heater systems for light assemblies.

BACKGROUND

In one type of implementation, light emitting diodes (LEDs) are used as the light source in a light assembly. The use of LEDs is rising in popularity in wide ranging lighting applications due to energy savings, longevity, durability, and ease of packaging. While there are significant benefits to the use of LEDs, there are some differences in characteristics when compared to traditional lighting solutions, such as incandescent and halogen technologies.

Reduced heat output from LEDs is a primary issue compared to traditional lighting systems that generate sufficient heat. This has implications that may cause safety concerns due to the inability of the LEDs to generate enough heat to defog/de-ice lighting systems used in safety applications which can include vehicle lighting, e.g., tail lights, head lights, etc., entry lighting, runway lighting, traffic signals, railroad crossings, and aviation.

Another industry challenge with LED lighting is the performance of ancillary electronic components over time. The LED itself is extremely robust while the capacitors and other passive components tend to be a point of premature failure. These failures are caused by connection means, i.e., cold solder joints, etc., vibration and changes in temperature of the device.

SUMMARY

In one example, a heater system for an LED light assembly having a lens includes a flexible composite positioned around an outer surface of the lens. The flexible composite includes a polymer base layer, a plurality of conductive buses provided on the base layer, and a resistive layer electrically connecting the plurality of buses to form a circuit. The resistive layer includes conductor particles dispersed in a polymer matrix. The resistive layer has a crystalline first condition prior to applying electricity to one of the buses and an amorphous second condition in response to applying electricity to one of the buses.

In another example, a heater system for an LED light assembly having a lens includes a flexible composite. The flexible composite includes a polymer base layer supporting conductive buses and a resistive layer electrically connecting the buses to form a circuit. The resistive layer has a crystalline first condition prior to applying electricity to one of the buses and an amorphous second condition in response to applying electricity to one of the buses. The LED light assembly includes an LED board and the flexible composite is positioned on a surface of the LED board.

In another example, a heater system for an LED light assembly having a lens includes a flexible composite. The flexible composite includes a polymer base layer, a plurality of conductive buses provided on the base layer, and a resistive layer electrically connecting the plurality of buses to form a circuit. The resistive layer includes conductor particles dispersed in a polymer matrix. The resistive layer has a crystalline first condition prior to applying electricity to one of the buses and an amorphous second condition in response to applying electricity to one of the buses. A grommet includes an inner surface for securing to the flexible composite. The grommet is positioned over the lens to locate the flexible composite adjacent to the lens.

Other objects and advantages and a fuller understanding of the invention will be had from the following detailed description and the accompanying drawings.

DETAILED DESCRIPTION

Figure 1A:
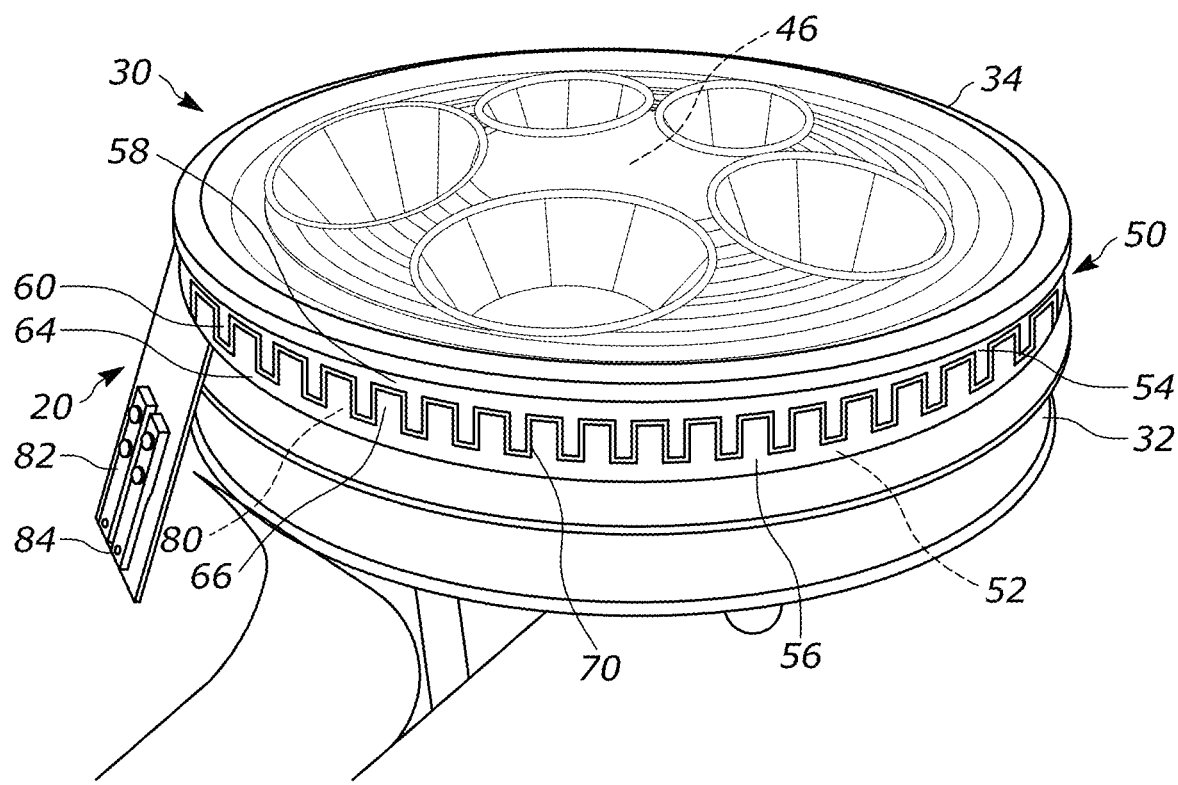
FIG. 1A illustrates an example heater system including a flexible composite attached to an outer diameter of a lens of an LED light assembly.

The present invention relates generally to heater systems, and specifically to heater systems for light assemblies. The heating or heater systems of the present invention are particularly suited for use with outdoor LED light assemblies and, more specifically, to aftermarket and OEM vehicle LED light assemblies. Other applications are contemplated.

In the field of vehicle LED lighting assemblies, some embodiments of the invention are directed to providing an aftermarket product that is added to the LED light assembly after the production of the vehicle or light assembly. Some embodiments of the invention are directed to providing an integrated OEM product that is positioned within the LED light assembly, e.g., inside the housing that includes a lens and back cover.

In such cases, the LED light assembly can be ultrasonically welded shut to enclose the LED(s) and other internal components. The heater system can be carried by the LED light assembly or attached to/positioned on a grommet that receives the LED light assembly. To this end, the heater system can be connected to an internal item within the enclosure of the LED assembly or located adjacent to the perimeter wall of the lens or grommet.

The heater system shown and described herein is in a heating relationship with a lens of an LED light assembly and is configured to generate heat for the heating relationship with a phase-changing resistive polymer layer. More specifically, a resistive layer in the heater system is in a heating relationship with the lens of the LED light assembly by being positioned a distance to the lens sufficient to apply heat thereto, e.g., sufficient to thaw the lens or buildup of ice or snow on the lens comparable to an incandescent light. To this end, the resistive polymer layer can contain conductor particles, such as carbon particles, and is in crystalline form at room temperature.

When a voltage is applied across the resistive layer, e.g., from adjacent conductive buses, the layer carries a current via the conductor particles. As a result, the temperature of the resistive polymer layer rises until it exceeds the polymer's transition temperature, causing the polymer to changes from its initial crystalline phase to an amorphous phase. In the amorphous phase, the conductor particles are spaced further apart from one another [relative to the crystalline phase] and, thus, the electrical resistance of the resistive polymer layer increases until current is prevented from passing through the resistive layer. This, in turn, prevents current from passing through the conductive buses to prevent further heating thereof.

In some embodiments, there are two conductive buses with each having a corresponding terminal. In an arrangement where the heater system can be wrapped or attached to surface the terminals can be positioned to be attached to the corresponding bus at opposing ends of the heater system.

An insulating layer can be configured to work in relation to the heat generated by the resistive layer to direct heat in a direction or to block heat flow emanating towards a region. The insulating layer can be positioned as a layer over or under the restrictive layer.

The present technology provides a low profile, e.g., flat, and highly adaptable, e.g., flexible, device that can be integrated into LED light assemblies while providing heating at the same or similar level to an incandescent lamp for a similar application. The heater system can be adapted to fit the LED light assembly. For example, the flexible composite can be attached to an outer diameter of a lens of an enclosure or an inner diameter or wall of a grommet. This allows end users to conveniently retrofit the flexible composite to existing light assemblies and eliminate the cost of purchasing and replacing an entire lighting assembly.

Alternatively, the flexible composite can be located on a surface of an LED board opposite to a lens or an internal surface of a light enclosure opposite to a lens. Advantageously, the flexible composite self-regulates its temperature and prevents overheating, thereby providing a sufficient and stable heat source to not only defog/de-ice lighting systems used in a variety of safety applications but also sustain the performance of ancillary electronic components over time.

It should be understood that embodiments of the present invention are particularly suited for outdoor LED light assemblies but one skilled in the art would understand the present invention may not be limited only to the outdoor LED light assemblies.

It should be also contemplated that one or more than one intermediate layers may be present among the layers of the polymeric PTC flexible composite. Alternatively, without one or more than one intermediate layers, each layer of the polymer directly touches adjacent layers. Each layer of the flexible composite may be present with a single layer or multiple layers.

A mention of a layer should not be interpreted to mean that it only means a single layer. Also the physical arrangement illustratively shown herein may show or describe direct contact or overlying relationship between physical elements. This can indicate direct physical contact but it should not be understood to be necessarily limited to it.

Some known heater systems or techniques have used etching to make fixed resistance heaters, which involve creating conductive pathways using an etching process. The illustrative embodiments described herein to implement polymeric, positive temperature coefficient (PTC), resistive-based heating can avoid the need to use an etching process which can have advantages.

Unless defined otherwise, all technical and scientific terms used herein have same meaning as commonly understood by one of ordinary skill in the art to which this invention belongs. Also, as used herein and in the appended claims, the singular form "a", "and", and "the" include plural referents unless the context clearly dictates otherwise.

The term "flexible composite" herein specifically means a flexible composite structure that includes a conductive layer and a resistive layer experiencing a PTC effect, both of which can include a polymer.

The term "about" herein specifically includes ±10% from the indicated values in the range.

Other terms or words that are used herein are directed to those of ordinary skill in the art in this field of technology and the meaning of those terms or words will be understood from terminology used in that field or can be reasonably interpreted based on the plain English meaning of the words in conjunction with knowledge in this field of technology. This includes an understanding of implicit features that for example may involve multiple possibilities, but to a person of ordinary skill in the art a reasonable or primary understanding or meaning is understood.

Figure 1B:
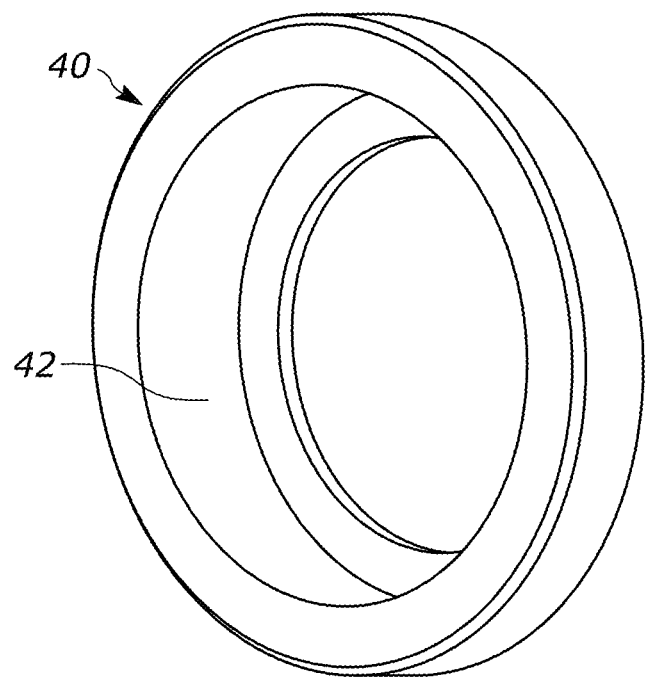
FIG. 1B illustrates a grommet for the LED light assembly of FIG. 1A.

FIGS. 1A-1B illustrate an example heater device or system 20 for an LED light assembly 30. The light assembly 30 includes an enclosure 32 having a lens 34 connected thereto. An LED board assembly 44 (see FIG. 3) is provided within the enclosure 32 behind the lens 34. A series of LEDs 46 is mounted to the LED board assembly 44 so as to emit light through the lens 34. A grommet 40 (FIG. 1B) extends around the periphery of the lens 34 and enclosure 32 to help secure the lens to the enclosure in a sealing manner.

The heater system 20 includes a flexible composite 50 attached to an outer surface, e.g., outer periphery, of the lens 34. The lens 34 could be round, square, etc. Accordingly, the flexible composite 50 is configured to be thin and flexible to readily enable contouring of the composite to a variety of outer surface shapes. The flexible composite 50 includes a first or carrier layer (not shown) made of an electrically insulating material that can be impervious to water and other debris to extend the service life of the products.

The flexible composite 50 further includes a polymer base layer 52 formed from a conductive material. The polymer base layer 52 can be, for example, a screen printed, flexible polymeric ink. The polymer base layer 52 includes a first bus 54 and second bus 56 spaced from each other. The first bus 54 includes an elongated base 58 and finger portions 60 extending away from the base. The second bus 56 includes an elongated base 64 and finger portions 66 extending away from the base. The bases 58, 64 can extend parallel to one another. The finger portions 60, 66 extend towards one another and can be interdigitated. That said, the finger portions 60, 66 are spaced from one another.

A resistive layer 70 is connected to, e.g., screen printed on, the polymer base layer 52 and can be modified or formed in desired shapes to electrically connect the first bus 54 to the second bus 56. Consequently, the resistive layer 70 can therefore be square wave shaped to match the contours of the finger portions 60, 66. The resistive layer 70 can have a higher electrical resistance than the polymer base layer 52 and experience a PCT effect when heated.

In one example, the resistive layer 70 includes conductor particles 74, e.g., a conductive carbon black filler material, dispersed in a polymer base or matrix 72 having a crystalline structure. The crystalline structure of the matrix 72 densely packs the conductor particles 74 into its boundary so they are close enough together at room temperature to form chains and allow conductive paths of current (indicated at 76) to flow through the polymer insulator via these carbon chains.

When the resistive layer 70 is at room temperature, there are numerous carbon chains forming conductive paths 76 through the matrix 72. When current passes through the resistive layer 70, the temperature of the resistive layer rises until the temperature exceeds the phase transformation temperature of the matrix 72 material.

Figure 2:
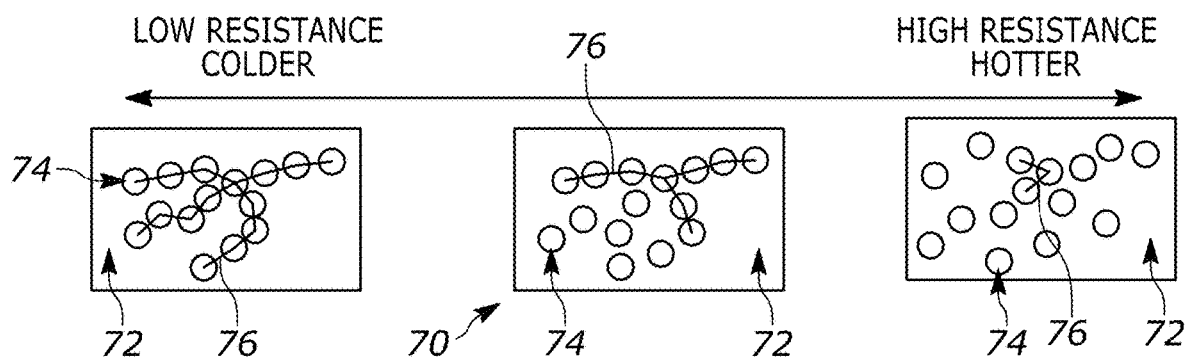
FIG. 2 is a schematic illustration of a phase transformation of a resistive layer of the flexible composite.

Referring to FIG. 2, as the material of the resistive layer 70 passes through this phase transformation temperature, the initial, densely packed crystalline polymer matrix 72 (left) transitions to an amorphous structure (right). This phase change is accompanied by a small expansion of the matrix 72, which causes the conductor particles 74 to move away from one another. Conductor particles 74 that exceed a threshold distance apart from one another no longer form part of a "chain" and no longer conduct current between one another. As a result, the electrical conductivity resistance of the resistive layer 70 increases sharply.

The resistive layer 70 will ultimately reach a designed steady state temperature in which current is prevented from passing through the resistive layer and, thus, prevented from passing through the buses 54, 56. The resistive layer 70 will thereafter draw a reduced amperage required to maintain the steady state temperature, thereby self-regulating its temperature and preventing overheating. The resistive layer 70 will stay "warm"—remaining in the high electrical resistance state as long as power is applied.

Removing power will reverse the phase transformation—causing contraction of the matrix 72—and allow the carbon chains to re-form as the polymer matrix re-crystallizes. The electrical resistance of the resistive layer 70 (and therefore of the flexible composite 50) thereby returns to its original value. In other words, the resistive layer 70 is electrically conductive at room temperature but heating the resistive layer reduces its electrical conductivity until current is prevented from passing through the resistive layer.

An interface layer 80 connects the flexible composite 50 to the LED light assembly 30. In one example, the interface layer 80 directly engages the outer diameter of the lens 34. The interface layer 80 can be directly connected to at least one of the polymer base layer 52 and the resistive layer 70. The interface layer 80 can be, for example, a double-sided adhesive. The interface layer 80 can include a peelable adhesive liner or backing including, for example, paper, vinyl or mixtures thereof (not shown).

In order to secure the flexible composite 50 the LED light assembly 30, the adhesive liner is peeled away from the interface layer 80. The interface layer 80 then adheres to the lens 34 and resistive layer 70 to completely seal the flexible composite 50 to the lens 34. Mechanical fastening, e.g., screws, bolts and/or Velcro fasteners, etc. can alternatively or additionally be used to secure the flexible composite 50 to an LED light assembly.

With this in mind, the dimensions of the flexible composite 50 can be configured based on the intended securing surface on the LED light assembly 30. To this end, termination points on the flexible composite 50 can be positioned to accommodate universal product dimensions including lengths, shapes, sizes, etc. The ends of the same flexible composite 50 or multiple flexible composites can be overlapped with each other without adverse effect. In other words, overlapping portions of the flexible composite(s) 50 are not negatively impacted by heat.

The heater system 20 further includes a rivet or crimped first terminal 82 connected to the first bus 54. A rivet or crimped second terminal 84 is connected to the second bus 56. After the flexible composite 50 is secured to the outer surface of the lens 34, the grommet 40 (FIG. 1B) is positioned around the enclosure 32, lens 34, and flexible composite 50 to seal the flexible composite on the LED light assembly 30. The grommet 40 may have one more grooves along the inner surface 42 (not shown) for receiving the flexible composite 50. Since the flexible composite 50 is thin, flexible, and can regulate to a given desirable temperature, it can be retained by the grommet 40 without adverse effect.

The flexible composite 50 can alternatively or additionally be secured directly to an inner surface 42 of the grommet 40 with an additional interface layer 80. That said, the flexible composite 50 can be either secured to the lens 34 before the grommet 40 is placed over the flexible composite or the flexible composite can be secured first to the grommet and then that subassembly is positioned over the lens. In any case, once the enclosure 32 is assembled and attached to the grommet 40, the flexible composite 50 placed on the inner surface 42 of the grommet 40 will efficiently transfer heat to the lens 34.

Figure 3:
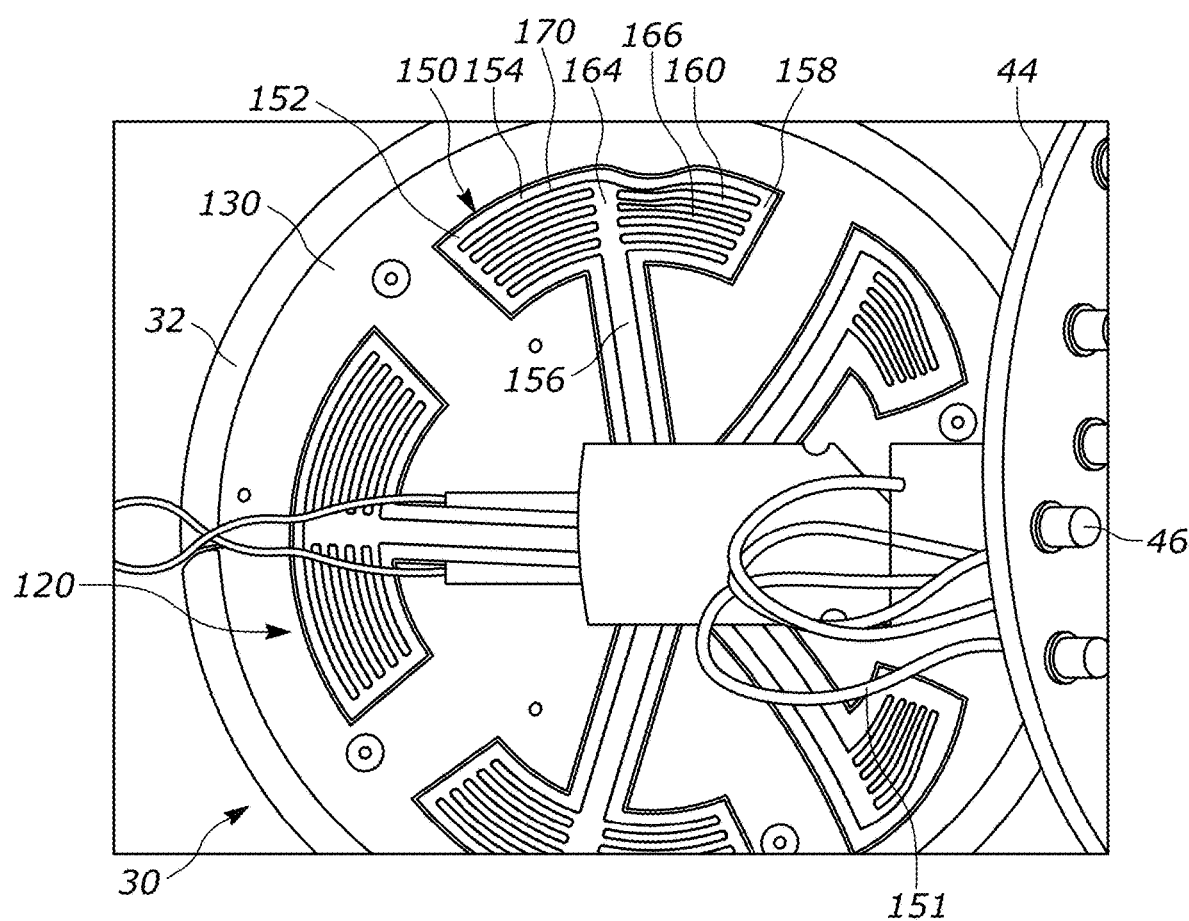
FIG. 3 illustrates another example heater system for LED light assemblies and including a flexible composite attached to an internal enclose surface of the LED light assembly.
Figures 4A, 4B:
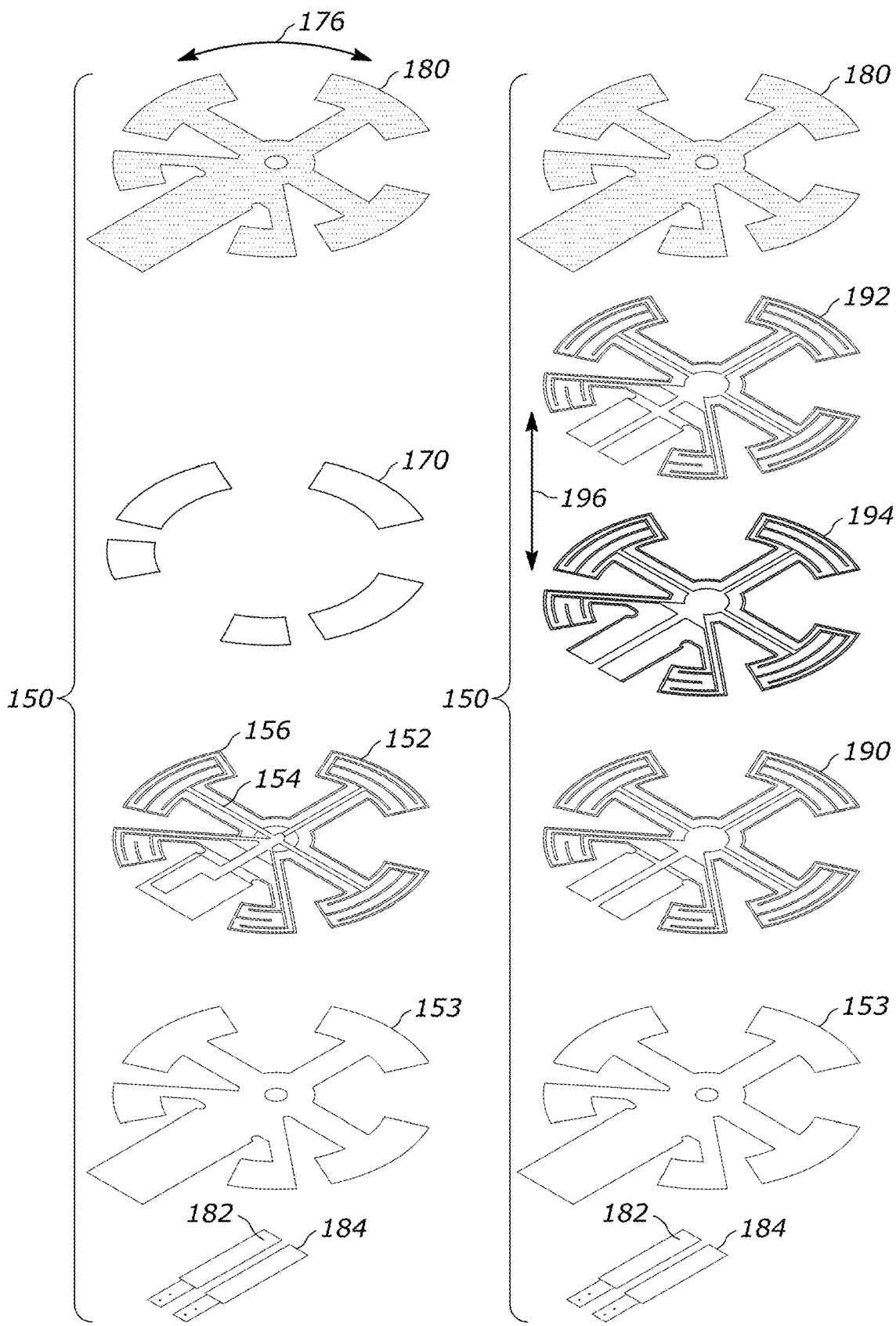
FIG. 4A illustrates an exploded view of the flexible composite of FIG. 3.
FIG. 4B illustrates an exploded view of another configuration for the flexible composite of FIG. 3.

Another example heater system 120 for the LED light assembly 30 is shown in FIGS. 3 and 4A. In this example, a flexible composite 150 is attached to an internal surface 130 of the enclosure 32 opposite the lens 34 (see also FIG. 1A). A first or carrier layer 153 is made of an electrically insulating material. The carrier layer 153 is thin and flexible.

A polymer base layer 152 is deposited on the carrier layer 153. The polymer base layer 152 includes conductive first and second buses 154, 156 spaced from each other. The first bus 154 includes a base 158 and finger portions 160 extending therefrom. The second bus 156 includes a base 164 and finger portions 166 extending therefrom. The finger portions 160, 166 can be interdigitated.

A resistive layer 170 electrically connects the first bus 154 and second bus 156. The resistive layer 170 can be generally star-shaped, radial-shaped or have a hub-and-spoke design to provide efficient and sufficient heat to the lens 34. Since the buses 154, 156 are positioned in the same plane and laterally spaced from one another, the resistive layer 170 connecting the circuit therebetween causes current to flow in a planar direction indicated at 176, i.e., the current flows laterally across the resistive layer. The buses 154, 156 are formed from a polymeric ink having a lower resistance than the resistive layer 170.

Depending on the application or requirement of heating, the polymer base layer 152 and the resistive layer 170 can be modified to desired shapes. That said, the pattern of the polymer base layer 152 and the resistive layer 170 determines the watt density of the heater system 120. In any case, the resistive layer 170 has a higher electrical resistance than the polymer base layer 152 and experiences a PTC effect when heated.

The interface layer 180 is directly connected to at least one of the polymer base layer 152 and the resistive layer 170. The interface layer directly engages the inner surface 130 of the enclosure 32.

It will be appreciated that the flexible composite 150 can alternatively be directly attached to a surface of the LED board assembly 44 opposite to the lens, such that the interface layer directly engages the surface of the LED board assembly. More generally, the flexible composite 150 can be placed adjacent to the LED board assembly 44.

The flexible composite 150 can be electrically connected with riveted or crimped terminations to the LED board assembly 44 via wires 151. The flexible composite 150 can also be screen printed onto the surface of the LED board assembly 44, with the electrical connections being made directly to copper pads thereon (not shown). Silver through-hole printing/vias can also be utilized to make connections between the flexible composite 150 and the opposite side of the LED board assembly 44. Still alternatively, the flexible composite 150 can be directly attached to other interior portion(s) inside the enclosure 32 and/or suspended within the enclosure. This may include a surface of the LED board assembly 44 not opposite to the lens 34.

The electrical resistive layer 170 is made of a polymer matrix including conductor particles dispersed therein that experience the aforementioned PTC effect once the heater system 120 heats. Screen printing, flexography and gravure printing, digital printing, e.g., inkjet, or roller coating can be used to make the resistive layer 170. One method for applying the polymer base layer 152 and resistive layer 170 to the carrier layer 153 is through screen printing. It should be understood that other techniques for printing or making the polymeric PTC structure such as the resistive layer 170 and buses 154, 156 are contemplated.

After the circuit is deposited onto the film surface, a rivet or other type crimp connection will connect terminals 181, 184 or a wire harness to the heater system 120 for connection to the power supply. The terminal crimping operation can also be completed after the entire circuit is sealed with the interface layer 180, leaving an opening for crimping of the terminal or harness to the polymer base layer 152. The connections can then sealed with a UV encapsulating material or equivalent (not shown).

An interface layer 180 formed from an adhesive is then applied to completely seal the circuit. The seal can establish a physical boundary (flexible boundary) that is impervious or substantially impervious to air, water, or other physical material that can affect the functioning of the circuit. The interface layer 180 can be double-sided and allow for the flexible composite 150 to be assembled directly to the LED board assembly 44, assembled to the enclosure 32, and/or suspended within the enclosure.

An alternative configuration for the flexible composite 150 is shown in FIG. 4B. In this configuration, the carrier film 153 and a circuit formed from two busses 190, 192 and a resistive layer 194 are stacked in the vertical direction (as shown). As a result, current flows through the flexible composite 150 in the direction of the Z-axis (indicated at 196), i.e., a direction normal to the stacked components. This allows for a tighter circuit design and increased watt density. The unique circuit pattern offers advantages for creating a highly flexible heater construction because more apertures and/or holes can be formed in the flexible composite 150.

The resistive layer 194 is preferably placed between the first bus 190 and second bus 192. The first bus 190, second bus 192, and resistive layer 194 can have the same or substantially the same shape. After the circuit is deposited onto the carrier layer 153, a rivet or other type crimp connection will connect terminals 182, 184 or wire harness to the circuit for connection to the power supply. The interface layer 180 can then be applied over the components 190, 192, 194 to completely seal the circuit.

Figure 5:
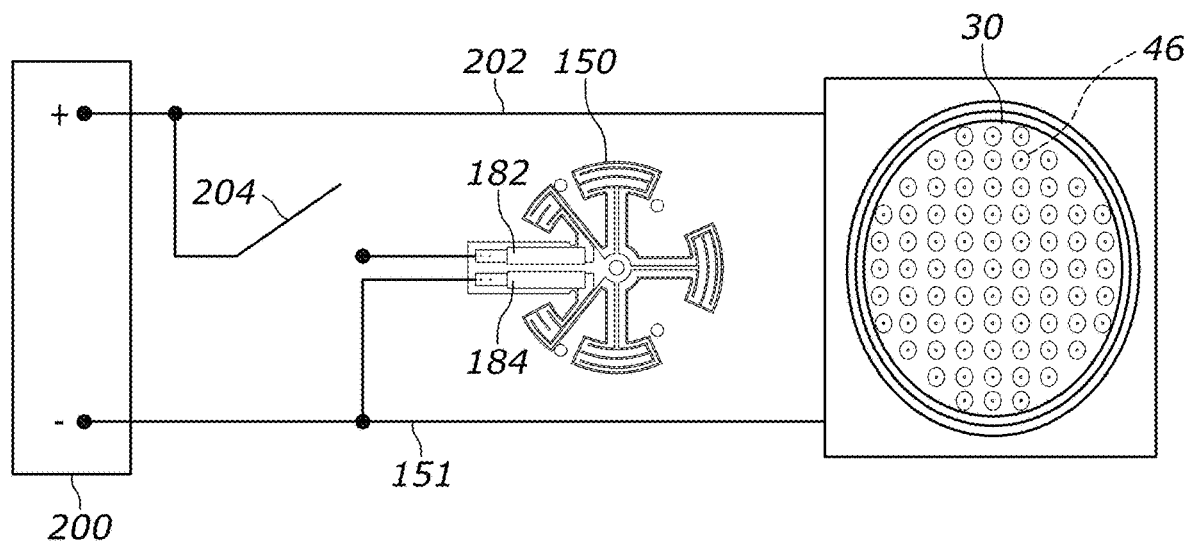
FIG. 5 illustrates a schematic diagram of a heater circuit with the flexible composite of FIG. 3.

FIG. 5 illustrates a schematic diagram of a circuit connecting the flexible composite 150 with the LED light assembly 30. It will be appreciated that the flexible composite 50 could alternatively be electrically connected to the circuit shown. That said, wiring 202 connects the LED light assembly 30 and flexible composite 150 to a common voltage supply device or power supply 200. Alternatively, an independent wire harness (not shown) can be secured to the flexible composite 150 for connecting the same to an independent power supply (not shown). In any case, the flexible composite 150 can operate with about 12V of voltage and about 15 W of power.

A thermostat 204 is connected to the wiring 202 or wire harness to enable control and/or programming of power flow between the power supply 200 and the flexible composite 150. In particular, the thermostat 204 can be programmed to initiate current flow from the power supply 200 to the flexible composite 150 when the temperature around the LED light assembly 30 falls below, for example, 0° C.

Figure 6:
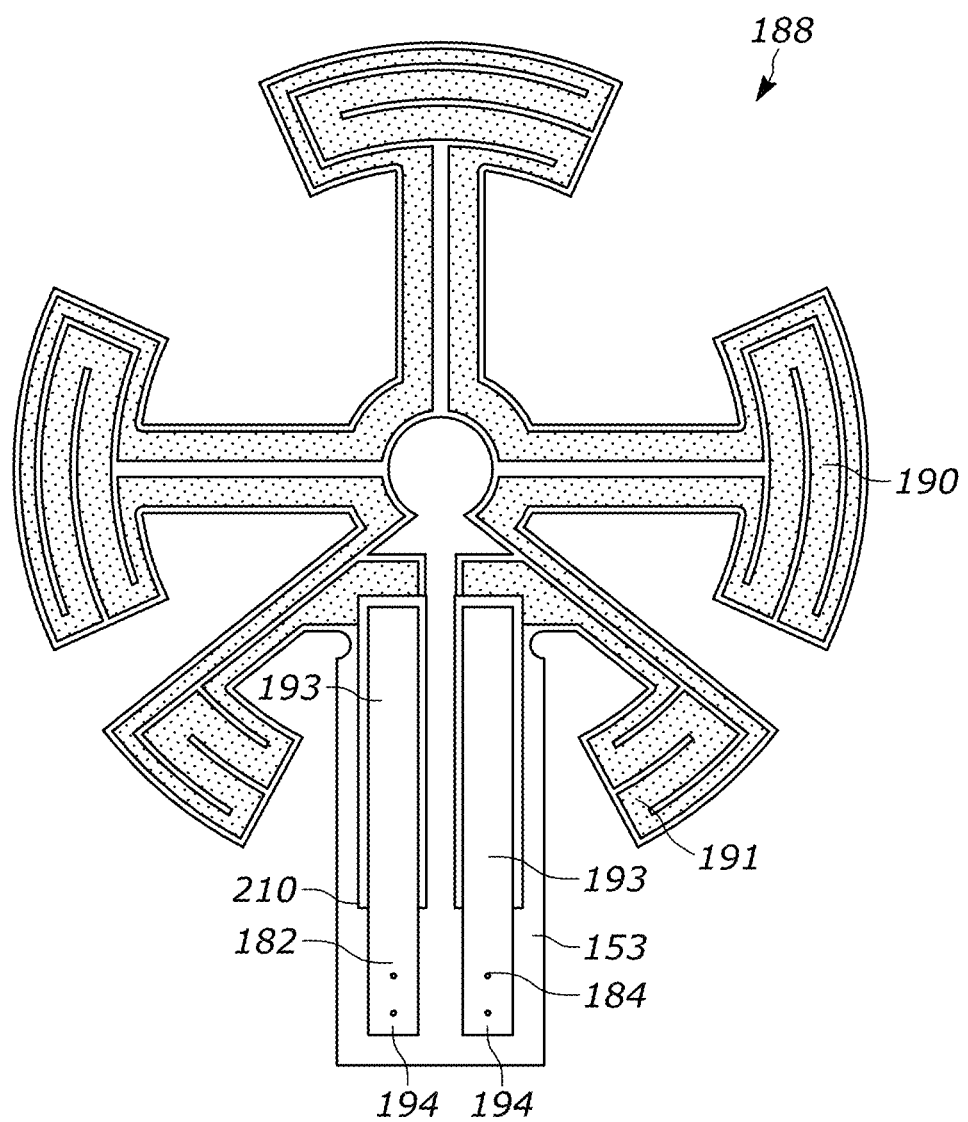
FIG. 6 illustrates a view of an illustrative hybrid construction of a flexible composite.

FIG. 6 is an illustrative hybrid configuration for a flexible composite 188. In FIG. 6, there is a PTC structure at or about the terminals 182, 184 for applying electricity to the flexible composite 188. To this end, the flexible composite 188 includes a first bus 190, a resistive layer 210 overlying a portion of the first bus, and a second bus 192 overlaying the resistive layer. The components 190, 192, 210 are therefore stacked in the vertical direction (as shown).

A portion 191 of the first bus 190 is not covered by the resistive layer 210. A portion 194 of the second bus 193 does not overlay the resistive layer 210. The portions 194 of the second bus 193 act as the terminals 182, 184 to electrically connect the flexible composite 188 to the power source and, for example, to the circuit shown in FIG. 5.

The dimensions of the components 193, 194, 210 can be equal or approximately equal to provide a vertical structure in which current flows vertically in a direction normal to the stacked components. This is in contrast to the configuration of FIG. 4A in which the current flows laterally across the resistive layer because conductors are positioned laterally away from each other.

The flexible composite 188 is configured to include an additional heating element provided by the conductive bus that is connected (or is part of) the conductive bus that is "on" the stacked structure. In other words, the uncovered portions 191, 194 of the buses 190, 193 can themselves act as additional heating elements. The PTC effect of the resistive layer 210 can operate to control how much current flows through to the additional heating elements, which by virtue of conducting electricity and the shape, e.g., as shown, can be used as an additional or supplemental heating element.

The flexible composite 188 as shown and configured has PTC heating and non-PTC heating because the portions 191, 194 of the buses 190, 193 are either not covered by the resistive layer 210 or substantially not covered, e.g., there could be some negligible amount of coverage, but the heating is derived primarily from the buses. The self-regulation by the resistive layer 210 can help control the amount of heat generated by the additional heating element.

Example 1

Figure 7:
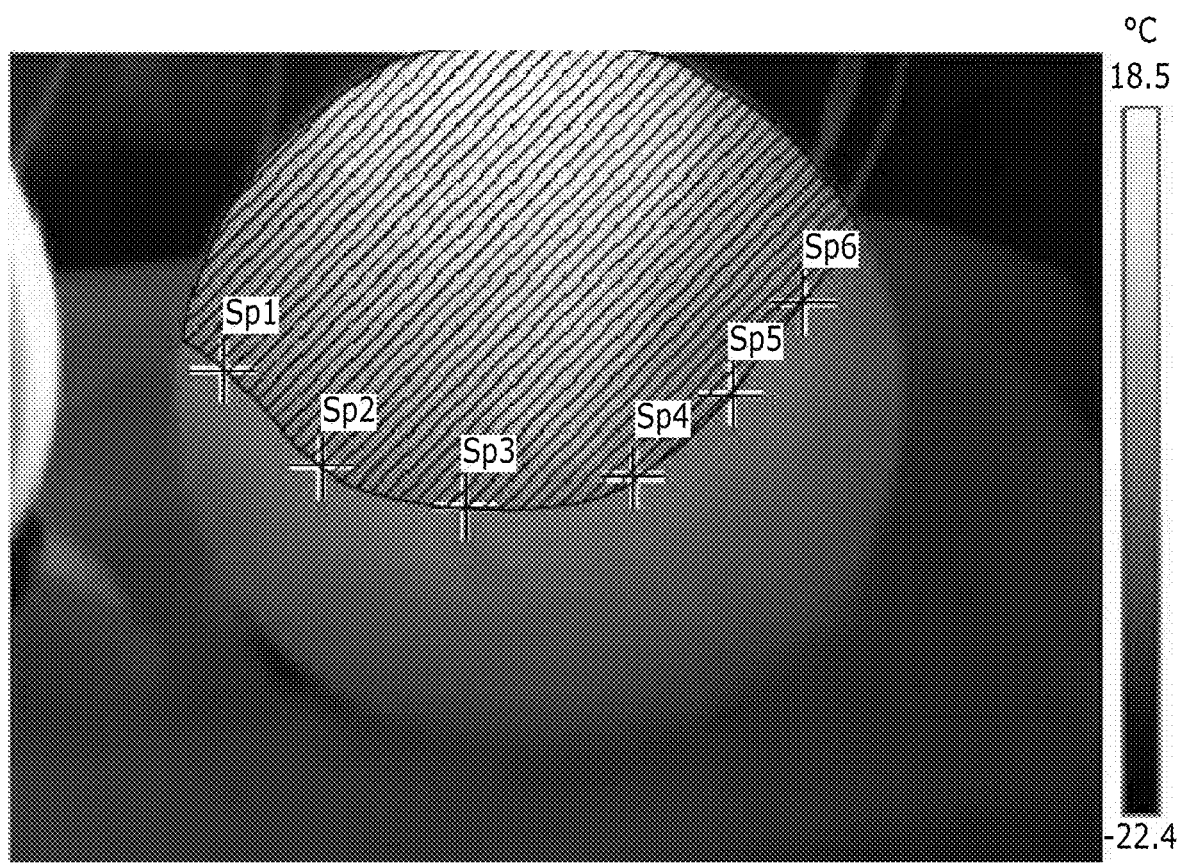
FIG. 7 is a thermal image of a lens of an incandescent bulb.

FIG. 7 illustrates a thermal image of a lens of an incandescent bulb. The incandescent bulb was provided without a flexible composite. Experimental conditions were summarized as follows:
- inrush current=0.5 A
- initial wattage=6 W
- steady state current=0.5 A
- steady state wattage=6 W
- testing temperature=about −152° C.
- lens stands vertically Data points Sp1, Sp2, Sp3, Sp4, Sp5, and Sp6 were measured to be about 0° C., which indicated that the temperature of the shaded area was higher than 0° C. A calculation of areas where temperature was determined to be higher than 0° C. suggested that at least 50% of the surface of the lens was defrosted within an hour. A baseline was therefore defined to be defrosting at least 50% of the lens surface within an hour.

Example 2

Figure 8:
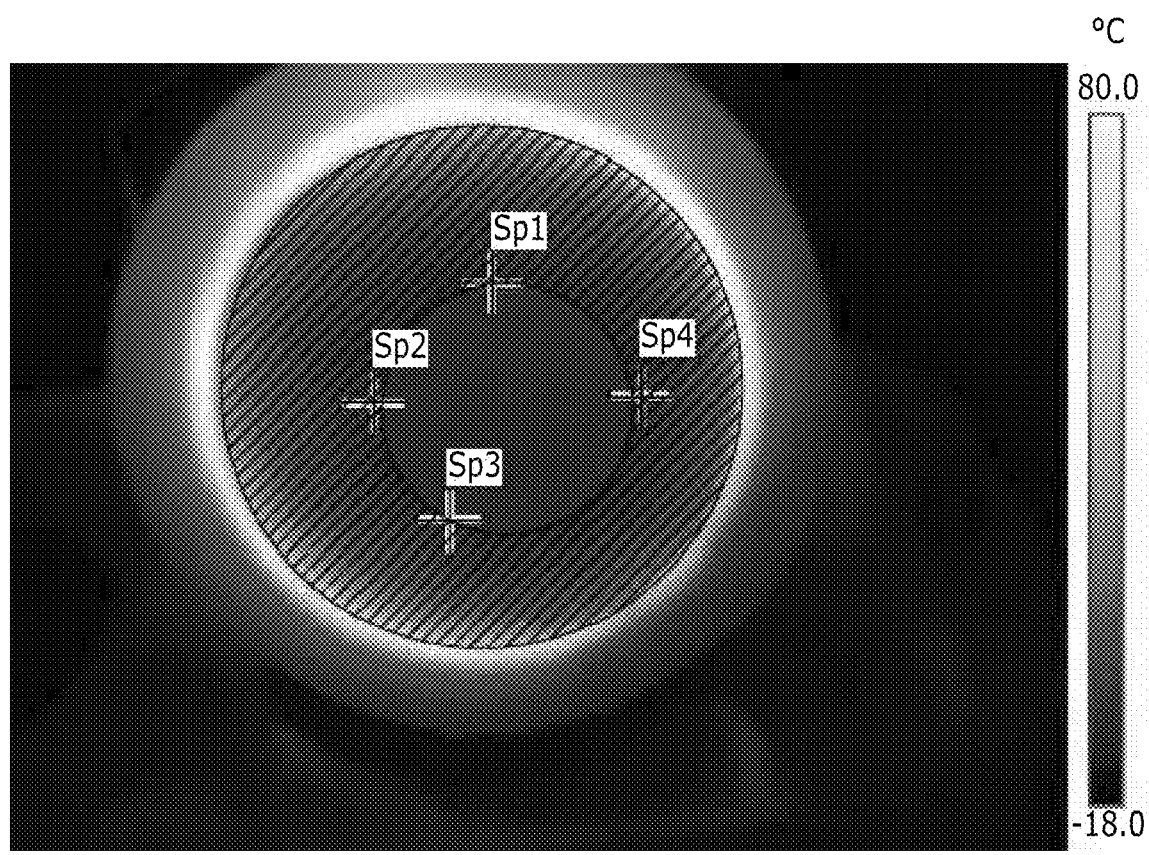
FIG. 8 is a thermal image of a lens of an LED light assembly with the heater system of FIG. 1A.

FIG. 8 illustrates a thermal image of a lens of the LED light assembly 30 including the flexible composite 50 attached to an outer diameter of the lens. Experimental conditions were summarized as follows:
- inrush current=2.9 A
- initial wattage=156 W
- steady state current=2.5 A
- steady state wattage=18 W
- testing temperature=about −152° C.
- lens stands vertically Data points Sp1, Sp2, Sp3, and Sp4 were measured to be about 0° C., which indicated that the temperature of the shaded area was higher than 0° C. A calculation of areas where temperature is determined to be higher than 0° C. suggested that at least 50% of the surface of the lens was defrosted within an hour. The result was comparable to the result of the incandescent bulb and satisfied the baseline.

Example 3

Figure 9:
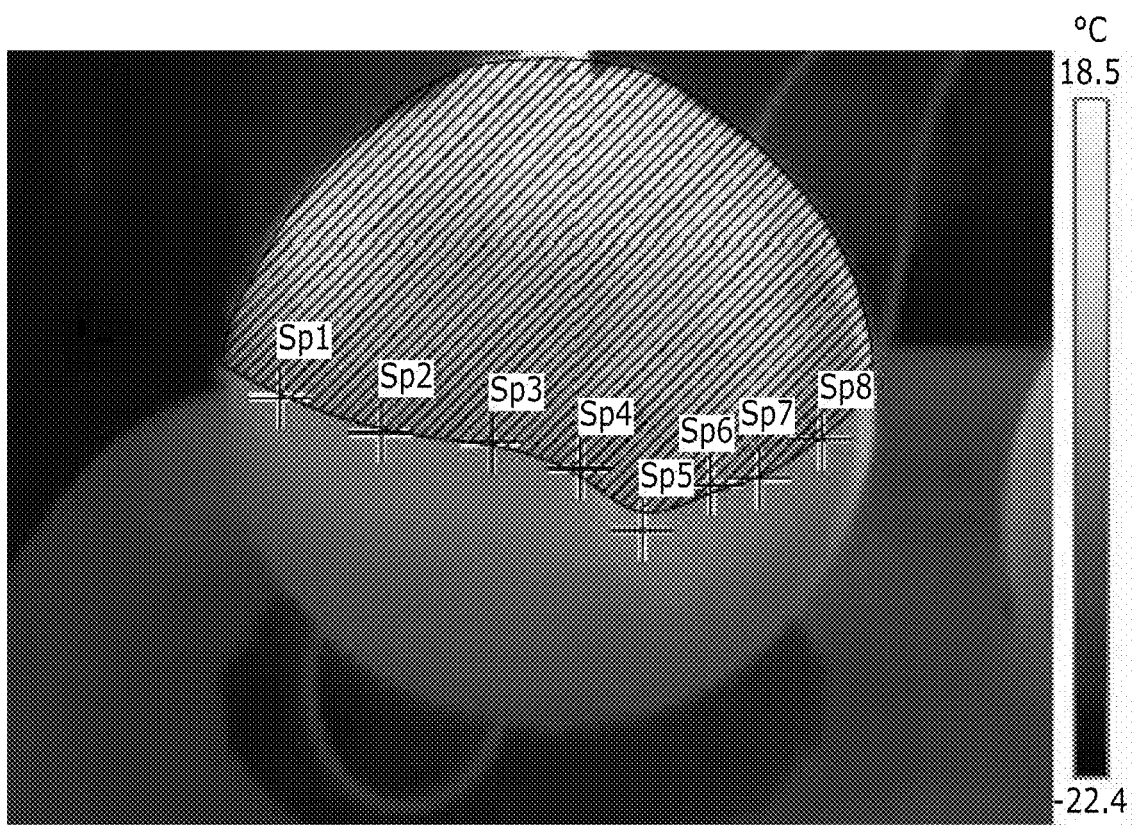
FIG. 9 is a thermal image of a lens of an LED light assembly with the heater system of FIG. 3.

FIG. 9 illustrates a thermal image of a lens of the LED light assembly 30 including the flexible composite 150 attached to the internal surface of the enclosure opposite the lens. Experimental conditions were summarized as follows:
- inrush current=1.5 A
- initial wattage=12 W
- steady state current=1.3 A
- steady state wattage=10.4 W
- testing temperature=about −152° C.
- lens stands vertically Data points Sp1, Sp2, Sp3, Sp4, Sp5, Sp6, Sp7, and Sp8 were measured to be about 0° C., which indicated that the temperature of the shaded area was higher than 0° C. A calculation of areas where temperature was determined to be higher than 0° C. suggested that at least 50% of the surface of the lens was defrosted within an hour. The result was comparable to the result of the incandescent bulb and satisfied the baseline.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A heater system for an LED light assembly having a lens, comprising:
a flexible composite comprising a polymer base layer supporting conductive buses and a resistive layer electrically connecting the buses to form a circuit, the resistive layer having a crystalline first condition prior to applying electricity to one of the buses and an amorphous second condition in response to applying electricity to one of the buses, wherein the LED light assembly comprises an LED board and the flexible composite is positioned on a surface of the LED board.

2. The heater system of claim 1, wherein the flexible composite is positioned adjacent the lens.

3. The heater system of claim 1, further comprising an interface layer directly connected to at least one of the polymer base layer and the resistive layer and configured to directly engage the LED board.

4. The heater system of claim 3, wherein the interface layer comprises a double-sided adhesive for directly engaging the LED board.

5. The heater system of claim 1, wherein the LED light assembly is attached to a vehicle lighting system.

6. The heater system of claim 1, wherein the buses and the resistive layer are stacked on one another such that current flows therethrough in a direction normal to the stack, and wherein one of the buses forms a heating element for producing heat in response to current flow therethrough with the amount of current flow being controlled by the resistive layer.

7. The heater system of claim 6, wherein the heating element is formed by a portion of the one of the buses being substantially out of contact with the resistive layer.

8. The heater system of claim 1, wherein the buses and the resistive layer are positioned in a plane such that current flows therethrough in a direction parallel to the plane.

9. The heater system of claim 1, wherein the buses and the resistive layer are stacked on one another such that current flows therethrough in a direction normal to the stack.

10. The heater system of claim 1, wherein the buses and the resistive layer are printed directly onto a surface of the LED board to form a circuit.

11. The heater system of claim 10, wherein the surface of the LED board is opposite LEDs.

12. The heater system of claim 11, wherein the flexible composite is connected to the opposite side of the LED board via printed through vias.

* * * * *